April 19, 1960
H. M. AUGSBURGER
2,932,921
MEANS FOR NEUTRALIZING CURRENT IN GLASS WITHDRAWN
FROM ELECTRICALLY HEATED FURNACE
Filed April 19, 1957
2 Sheets-Sheet 2
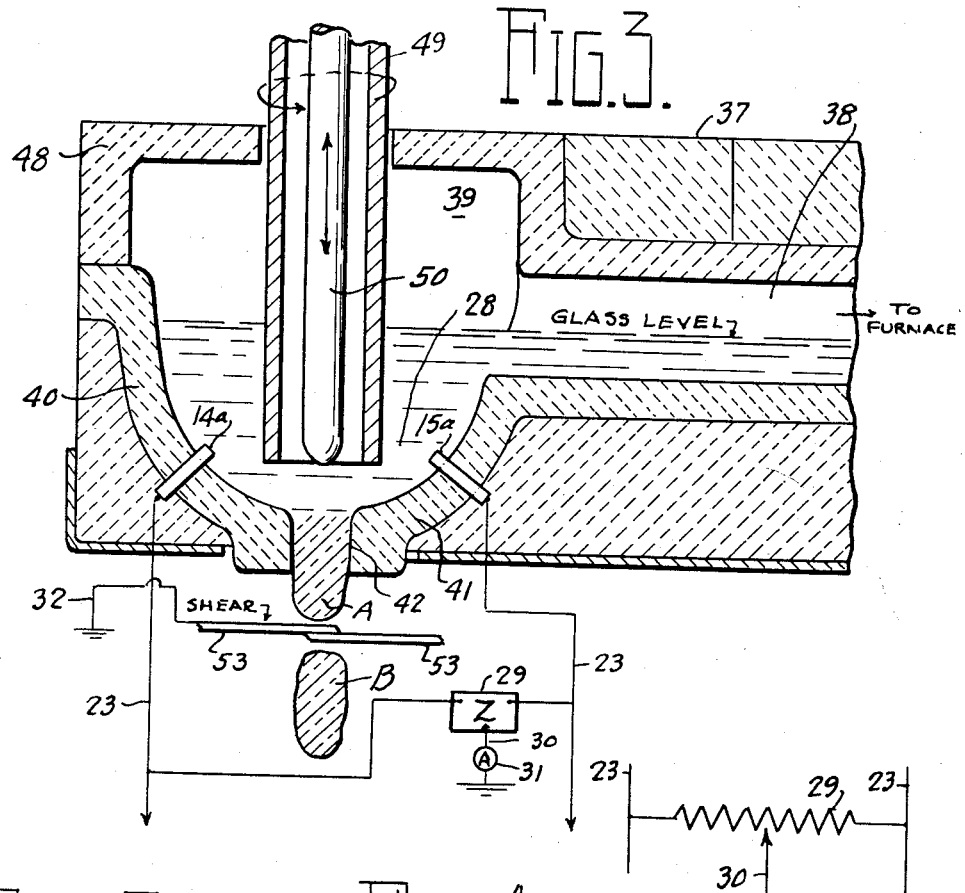
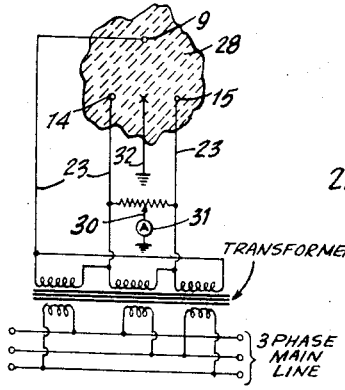
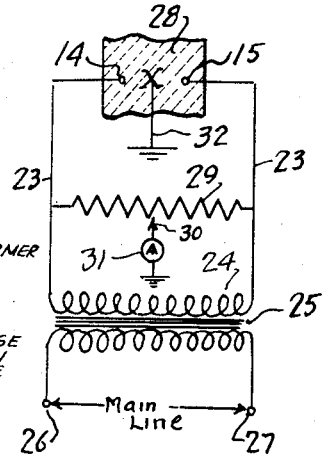
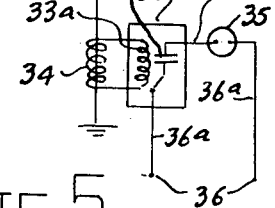
INVENTOR.
Herbert M. Augsburger
BY
J. R. Nelson and
Leonard D. Soubier
ATTORNEYS

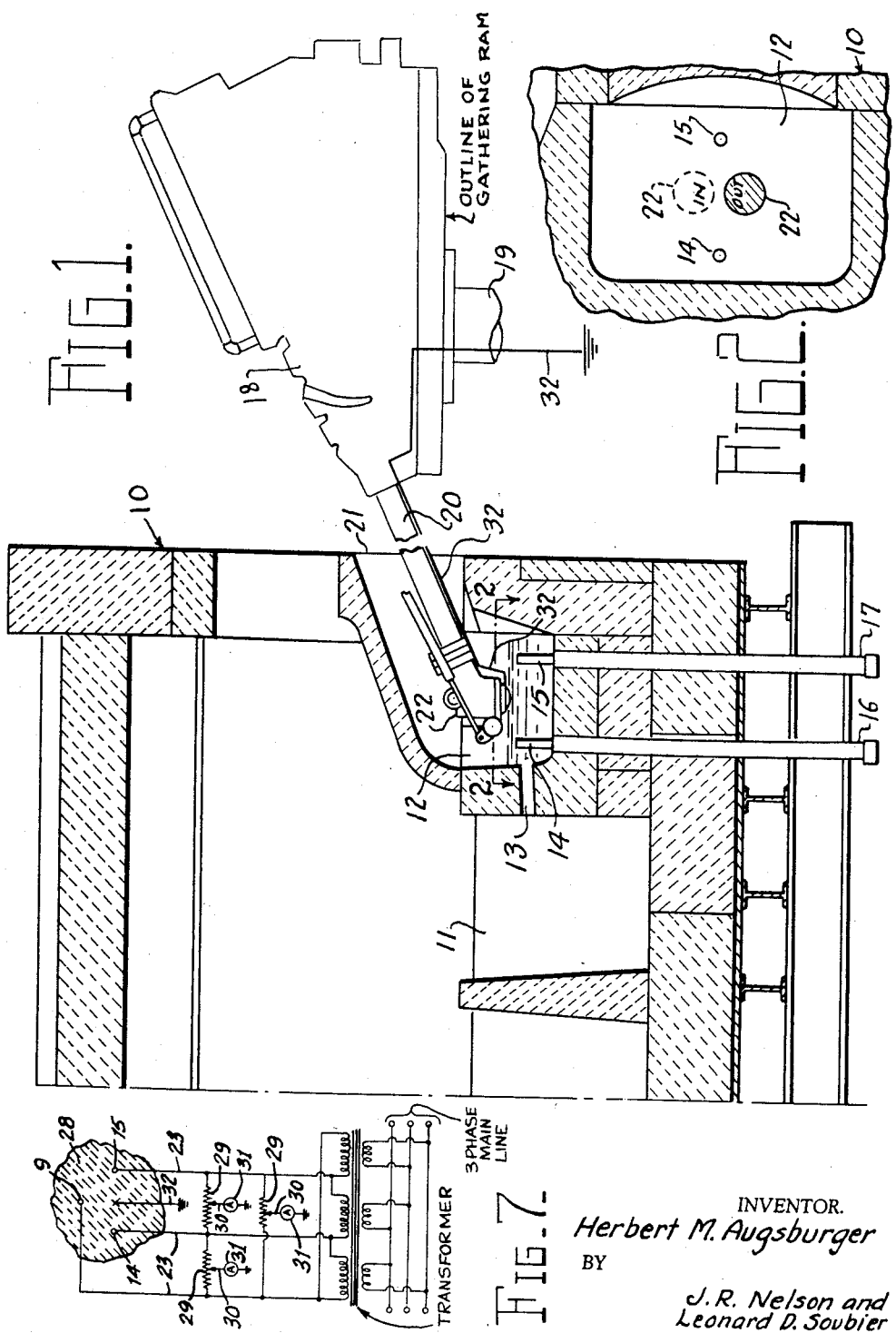

United States Patent Office 2,932,921
Patented Apr. 19, 1960

2,932,921

MEANS FOR NEUTRALIZING CURRENT IN GLASS WITHDRAWN FROM ELECTRICALLY HEATED FURNACE

Herbert M. Augsburger, Sylvania, Ohio, assignor to Owens-Illinois Glass Company, a corporation of Ohio Application April 19, 1957, Serial No. 653,780

10 Claims. (Cl. 49—55)

This invention relates to a glass furnace provided with Joule effect heating in the working zone, and more particularly to a means for neutralizing current flow therein at the point of withdrawal of the glass from said working zone.

In the manufacture of glass, the raw product is melted and refined in a furnace and then flows through a passage into a working zone where the glass is withdrawn either by continuous flow through an orifice whereupon it is severed into working charges by timed reciprocation of shears, or is retained in a boot or other enclosure and gathered and withdrawn by a gathering ram through which suction is applied to load the ram with the charge of glass. While the glass is retained in the working zone, it is desirable to control the cooling effect thereon by supplying heat to it through heat of combustion of consumable fuels (which is the more conventional method) or by Joule effect heating applied near the point of withdrawal of the glass. It is this latter method of conditioning the glass in the working zone to which this invention is directed.

When applying an electric current to the glass by placing electrodes in the working zone and heating the glass through the resistance effect to current passage therethrough, an electric potential exists at various points in the glass mass between the electrodes. There is a neutral point in the glass between the electrodes of which the potential measured to ground will be zero. It is most desirable to withdraw the glass at that point, however, due to varying characteristics of the glass which changes its resistance with changes in temperature, this neutral point will vary. Consequently, glass may be withdrawn in a fixed location which, under one set of conditions, is at neutral potential and, if the conditions change during operation, the point of neutral potential will change accordingly.

If glass is withdrawn at a point in the working zone where there is an electric potential to ground, a current flow through the withdrawn glass will result. This current flow will have detrimental effects on the glass withdrawn, depending on the type of withdrawal apparatus utilized, as follows:

In cases where the gathering ram device is utilized, the ram enters the glass from an angle inclined to its surface, travels a short horizontal distance through the glass while gathering, and is then withdrawn at a point other than where it entered. If it is withdrawn at a point where there is an electric potential to ground, current will flow from the glass mass in the working zone through the charge being withdrawn, and, as the charge leaves the mass from which it is withdrawn, an electric arc may result, or portions of the withdrawn charge will be heated non-uniformly resulting in a defect in the glass charge.

If the glass is withdrawn through an orifice, and then fed in a stream past a pair of reciprocating shears which sever the stream of glass into working charges, any current flow in this stream of glass undergoing withdrawal resulting from a potential to ground will cause an electric arc at the shears during severing. This arcing has detrimental effects on the glass charge being severed and also tends to cause accelerated amount of wear to the shears.

It is, therefore, an object of the present invention to provide a means for withdrawing glass from an electrically heated working zone in which a negligible amount or no amount flow of electric current is present in the glass being withdrawn.

It is another object of the present invention to provide apparatus for adjusting the potential to ground at substantially zero at the point of withdrawing the glass from a working zone of a furnace wherein electric currents are present.

It is still another object of the invention to provide an energized power circuit for heating the glass in a furnace working zone which is connected in parallel with an adjustable impedance, the impedance being adjustable to neutralize the electric potential appearing in the glass at the point of withdrawal from the working zone by proportionally dividing the impedance to ground to correspond to neutral at the point of withdrawal in the glass mass.

The specific nature of this invention, as well as other objects and advantages thereof, will become apparent to those skilled in the art from the following detailed description, taken in conjunction with the annexed sheets of drawings on which, by way of preferred example only, are illustrated two embodiments of this invention.

In the drawings:

Fig. 1 is a sectional elevational view, showing the electrically heated working zone of a furnace representing the first embodiment of the invention, and having an insertable gathering ram device for withdrawing charges of glass from the working zone.

Fig. 2 is a sectional plan view taken along lines 2—2 of Fig. 1.

Fig. 3 is a sectional elevational view, showing a working zone wherein glass is withdrawn through a bottom orifice continuously, and represents the second embodiment to which the invention is applied.

Fig. 4 is a schematic wiring diagram showing the circuits utilized for both embodiments of the invention.

Fig. 5 is a partial schematic wiring diagram, showing a modification of the circuit of Fig. 4.

Fig. 6 is a schematic wiring diagram showing the invention as applied to a body of molten glass and heated by a plurality of electrodes energized in a polyphase power circuit, wherein the glass is being withdrawn intermediate a pair of the electrodes.

Fig. 7 is a schematic wiring diagram showing the invention as applied to a body of molten glass and heated by a plurality of electrodes energized in a polyphase power circiut, wherein the glass is being withdrawn intermediate all of the electrodes.

In Fig. 1 the forward portion of a melting furnace, referred to generally at 10, includes a refining chamber 11 into which molten glass is introduced from a melter (not shown) for refining prior to working. The refined glass then enters boot 12, through passage 13, and a normal level of the molten glass is constantly maintained in boot 12 for withdrawal. While retained in boot 12, the glass is therein conditioned and maintained at the desired working temperature by addition of Joule effect heating of electrodes 14 and 15 which are introduced through the bottom of boot 12 and supported respectively, by electrode holders 16 and 17. Electrodes 14 and 15 are connected into a power circuit, which will be hereinafter described, and electric current is passed between said electrodes through the glass in boot 12. Spaced outwardly of boot 12 at a suitable operating distance is a gathering ram device 18 supported on its spindle 19 which serves as a vertical pivot post. The operation of gathering ram device 18 is fully set forth and described in U.S. Patent No. 2,150,637 to H. R. Schutz. During operation, the gathering ram 20 of device 18 is inserted into boot 12 through opening 21 therein and a gathering mold 22 carried on the outer end of gathering ram 20 is inserted into the glass at a point intermediate of electrodes 14 and 15.

As indicated in Fig. 2 by phantom outline, gathering mold 22 enters the glass at a point ("In" position on Fig. 2), gathering ram device 18 then pivots on its spindle 19 a short distance, and gathering mold 22 is filled with a charge of glass and withdrawn at a position represented by its solid outline ("Out" position on Fig. 2). The point in the glass midway between electrodes 14 and 15 normally has zero potential to ground. However, due to the fact that the gathering mold merely passes through this point of zero potential and is subsequently withdrawn at a point spaced therefrom, there may be an electrical potential in the glass at the point where gathering mold 22 exits. If this is the case, a current will flow into the gathered glass charge in gathering mold 22, and cause the detrimental effects to the withdrawn charge as mentioned herein.

Referring now to Fig. 4, the circuit for both embodiments of the invention will be described. The point X in Fig. 4 represents the location in boot 12 at which glass is withdrawn ("Out" in Fig. 2). Electrodes 14 and 15 are connected into a power circuit 23 connected to the secondary windings 24 of transformer 25. Transformer 25 is connected across terminals 26 and 27 of a main line source of electric power. With current flowing in power circuit 23 across electrodes 14 and 15, the glass mass 28 between said electrodes acts as a main resistance in the circuit. This resistance presented by glass mass 28 consumes electric power which is converted to heat therein for controlling the temperature of the glass in boot 12 to the desired degree. Impedance 29 is connected across the power circuit 23 in parallel with the main resistance of that circuit, the glass mass 28. Impedance 28 may take the form of a tapped reactor, auto transformer, tapped resistor or other suitable impedance device having an adjustable tap connection, referred to at 30 in this schematic diagram. The tap connection 30 is connected to one terminal side of an ammeter 31, or other suitable current measuring device, and the other terminal side of ammeter 31 is grounded. The means for withdrawing the glass from the working zone, which in this first embodiment is gathering mold 22 on gathering ram 20, has an electric conductor 32 which is electrically connected to the glass contacted upon insertion of gathering mold 22 into the glass in boot 12 (Fig. 1). The electrical conductor 32 then extends to ground. The combination of tapped connection 30, ammeter 31 and its connection to ground, and the electric conductor 32 connected between the glass undergoing withdrawal and ground comprise a detector circuit connected between glass mass 28 and an adjustably connected point on impedance 29. This described detector circuit comprises a portion of a bridge circuit connected into power circuit 23.

In a simple bridge circuit of this type, it is known that the ratio of the electric potential impressed between the electrode 14 and point X and electrode 15 and point X is proportional to the ratio of the electric potential impressed between electrode 14 and adjustable tap 30 and electrode 15 and tap 30. Accordingly, by having tap 30 of impedance 29 adjustable at a voltage existing between electrode 14 and tap 30 equal to the voltage existing between electrode 15 and tap 30, the ratio of voltage between electrode 14 and point X in glass mass 28 and electrode 14 and point X will likewise be equal. Therefore, the potential in the glass at point X, which is the point of withdrawal of the glass from glass mass 28, will be zero and no current will flow in the glass undergoing withdrawal.

By adjusting impedance 29 to establish this condition, current flow in the glass being withdrawn may always be prevented The detector circuit described above may, if desired, be modified by having a direct connection between electrical conductor 32 and ammeter 31, thereby eliminating the respective ground connections on 32 and 31.

During actual operation of withdrawing glass from boot 12, if conditions change within glass mass 28 being heated to cause an electrical potential to appear at point X, a current will flow through detector circuit 32 from X to ground through conductor 32, then to the ground connection of ammeter 31, to tap connection 30 and impedance 29. Thus, ammeter 31 interposed in this circuit will register a reading of current flow. When this occurs, it will indicate that a current flow then exists through the glass undergoing withdrawal and tap connection 30 of impedance 29 may be adjusted accordingly to divide the potential in the bridge circuit, as described above, until ammeter 31 again registers zero.

In the detector circuit, ammeter 31 serves as a means of detecting current flow through the glass being withdrawn. Other means of detecting such flow may be readily used in this invention in addition to or in place of ammeter 31. For example, in Fig. 5, such a modification is illustrated whereby a relay 33 is responsive to induced current in coil 34. Current is induced in coil 34 by a current flow in the detector circuit through grounded tap connection 30. Any current present in the detector circuit will actuate relay 33 by energizing its coil 33a and close contact 33b to close the circuit of a signal device 35. Signal device 35 may be, for example, an illuminating lamp or a bell connected in circuit 36a across a 110 volt A.C. supply 36. Circuit 36a is connected through contact 33b of relay 33 to open or close. In this arrangement, relay 33 is responsive to current flowing in the glass being withdrawn and sets off an electric signal by closing a circuit to energize signal device 35. By then making the proper adjustment of impedance 29, as previously described, lamp 35 will no longer be illuminated since current flow through the glass being withdrawn is eliminated or minimized to a negligible value. When this occurs, no current will flow through the detector circuit and the contact 33b of relay 33 will reopen circuit 36a to disconnect signal device 35 from its source 36. In this manner signal device 35 serves as a visual or audible alarm to denote current existing in the withdrawn glass. It also indicates the proper neutralizing adjustment for tap 30 of impedance 29.

Referring now to Fig. 3, a second embodiment of the invention is illustrated, in which the bridge circuit, just described, is adaptable to a continuous flow feeder, wherein glass is fed through a delivery orifice in a stream and severed into unconfined working charges by a reciprocating pair of opposed shears. In this embodiment, common elements of the circuit, just described in Fig. 4, are indicated by common reference numbers.

Forehearth 37 of the furnace defines a channel 38 which communicates at its outer end with feed spout 39 defining a working zone of the furnace. Channel 38 connects a body of molten glass in the refining zone of the furnace (not shown) and feeds refined glass by gravity to feed spout 39, maintaing a level of glass therein as indicated on Fig. 3. Feed spout 39 has integral side wall 40 and bottom wall 41. A centrally disposed orifice outlet 42 is provided in bottom wall 41 for withdrawing glass from the working zone in a continuous stream A. As stream of glass A leaves orifice outlet 42, it flows between a pair of reciprocating shears 53. Shears 53 are supported and actuated at timed intervals by means well known in the glass art to sever working charges or gobs B from the stream A. Ground wire 32 is connected between shears 53 and ground.

A cover structure 48 of refractory is provided over feed spout 39 to complete the enclosure of said spout and cover 48 is provided to receive centrally thereof a hollow cylindrical sleeve 49. Sleeve 49 is supported by conventional means (not shown) for continuously rotating it and holding the lower portion thereof partially submerged in the glass contained in feed spout 39.

A needle plunger 50 is vertically reciprocated concentrically inside sleeve 49 so that the lower end of said plunger is submerged in glass in spout 39 at all times. Plunger 50 is supported and actuated by mechanism of the type shown and described in U.S. Patent No. 1,631,107 to K. E. Peiler. As is well known glass feeding practice, the rotating sleeve 49 and vertically reciprocable plunger 50 constitute a means for mixing the glass in spout 39 and controls the issuance of glass through the underlying orifice outlet 42.

To further control the temperature and cooling effects of the glass in feed spout 39, electrodes 14a and 15a are inserted through side wall 40 and are connected electrically into power circuit 23 to energize the electrodes and apply heat to the glass in feed spout 39. As described under the circuits for the first embodiment a tapped impedance 29 is connected in parallel with the glass mass 28 lying between electrodes 14a and 15a and the adjustable tap 30 of impedance 29 is grounded to comprise a segment of a circuit, connected as follows: Tap 30 is connected by wire 32 to one terminal of an ammeter 31 having its other terminal grounded. The glass stream A being severed by shears 53 is grounded through the aforementioned connection to ground 32 of shears 53 in contact with the glass of stream A. The detector circuit is thus connected through ground.

Thus, in this embodiment of the invention, the point of withdrawing the glass in outlet orifice 42 may be set at zero potential by adjustment of impedance 29, as previously described for the similar circuit of the first described embodiment. In withdrawing glass from the working zone in this manner, electrodes 14a and 15a may be inserted to adjust the point of withdrawal of the glass at outlet orifice 42 at zero potential. However, these adjustments are difficult to attain, and even if made correctly at the time of neutralization, corrosive wear on the electrodes may alter this adjustment to cause a positive potential at the point of withdrawal of the glass. Furthermore, the rotating sleeve 49 and reciprocating plunger 50 create mixing in the glass which may from time to time alter the resistive characteristics thereof. This too may cause an electric potential to exist at the point of withdrawal. Accordingly, by utilizing the previously described current flow detectors such as ammeter 31, signal device 35 (Figs. 4 and 5), a current flow in the withdrawn glass may readily be detected and an appropriate adjustment in the bridge circuit at impedance 29 will again divide the potential of the circuit to reduce the potential at the point of withdrawal to zero, and eliminate current flow in the glass being withdrawn.

The glass being withdrawn as stream A, is severed by a pair of transverse reciprocating shears 53 which sever stream A into gobs B representing working charges of glass. Obviously, if current flow does exist in glass stream A undergoing withdrawal, contact by the reciprocating shears 53 will receive the current flow and arcing across the shears or localizing heating on a surface of gob B will result causing detrimental effects to the glass delivered. This current received at shears 53 will flow through ammeter 31, or device 35, whichever is used to detect current flow.

As used herein it should be understood that the term "working zone" includes a gathering area such as boot 12 (or other enclosed area) or feed spout 39, and "glass withdrawing means" or "means for withdrawing glass" shall include a gathering ram device insertable into the working zone for withdrawing as working charges of the glass, such as gathering ram device 18 (Fig. 1), or an orifice outlet and underlying reciprocating shears for withdrawing as working charges of the glass, such as 42, 53 (Fig. 3).

It is contemplated within this invention that electrodes used in the working zone may comprise a plurality of electrodes (9, 14 and 15) connected for energization to a polyphase circuit and that glass will be withdrawn between a pair of electrodes such as 14 and 15, connected across a single phase of such a power circuit. Such an arrangement is illustrated schematically on Fig. 6. If such an arrangement is utilized, the bridge circuit of this invention will be applied across that phase of the power circuit. If, however, it is desirable to withdraw glass at a point intermediate of more than one pair of opposed electrodes in a polyphase system, such as at a point intermediate electrodes 9, 14 and 15 energized in a three-phase power circuit, each of the phases of the polyphase circuit may be provided with the bridge circuit of this invention for adjustment to neutralize the potential in the withdrawn glass. Such an arrangement is illustrated schematically on Fig. 7.

Accordingly, further modifications may be resorted to within the spirit and scope of the appended claims.

I claim:

1. In a working zone of a glass furnace wherein glass is gathered for withdrawal therefrom, the combination of: at least one pair of electrodes in said working zone submerged in a molten glass mass contained therein, an electric power source, a single phase of a power circuit of said source connected across one of said pair of electrodes to apply heat to the glass in the working zone by Joule effect of current flowing through the glass mass between said electrodes, said glass mass comprising a main resistance, an impedance connected across said power circuit and in parallel with said main resistance, a detector circuit connected between a point on said main resistance and a point on said impedance, said last-mentioned connection being adjustable at will, said detector circuit comprising an electric conducting means engageable with glass of said glass mass undergoing withdrawal from the working zone and electrically connected to said adjustable connection on said impedance, whereby the current may be proportionally divided to flow in said glass mass by adjustment of said variable connection on said impedance and cause no current to flow through said detector circuit, and current measuring means interposed in said detector circuit to detect current flow therein.

2. The combination defined in claim 1, wherein the electric conducting means engageable with the glass of said glass mass undergoing withdrawal is connected to ground and said variable connection to the impedance is connected to ground, said two last-mentioned ground connections closing the detector circuit, and said current measuring means comprising an ammeter connected between the said adjustable connection to the impedance and ground.

3. The combination defined in claim 1, wherein said electric conducting means engageable with the glass undergoing withdrawal comprises a gathering ram device for withdrawing by suction charges of glass from the glass mass in the working zone intermediate said pair of electrodes, said gathering ram having a ground connection.

4. The combination defined in claim 1, wherein the electric conducting means engageable with the glass undergoing withdrawal comprises an orifice outlet in said working zone for feeding glass in a continuous stream, shears operable for severing charges of glass from said stream, and an electric connection on said shears and engaging said stream during severing, said connection being grounded.

5. In a working zone of a glass furnace wherein glass is gathered for withdrawal therefrom, the combination of: a pair of electrodes in said working zone and submerged in a molten glass mass contained therein, an electric power source, a power circuit from said source connected across said electrodes to apply heat to the glass in the working zone by Joule effect of current flowing through the glass mass between said electrodes, said glass mass comprising a main resistance, a bridge circuit connected across said power circuit for proportionally dividing the electric potential impressed across said main resistance thereof, said bridge circuit comprising an impedance connected in parallel with said main resistance, glass withdrawing means for withdrawing glass from the glass mass in said working zone said last-mentioned means being electrically connected to said glass mass during withdrawal, and electrically connected adjustably to a point on said impedance, and means cooperating with said impedance to vary the connection therewith and said glass withdrawing means, whereby the impedance may be adjustably divided to cause substantially zero current flow between said main resistance and said impedance through said glass withdrawing means.

6. The combination defined in claim 5, wherein additionally an ammeter is interposed in the electrical connection between said glass withdrawing means and said impedance to detect current flow therebetween.

7. The combination defined in claim 5, wherein additionally an electric signal device is interposed in the electrical connection between the glass withdrawing means and the impedance, said device being actuated responsive to current flowing therethrough.

8. In a working zone of a glass furnace wherein glass is gathered for withdrawal therefrom, the combination of: a plurality of electrodes in said working zone and submerged in a molten glass mass contained therein, said glass mass comprising a main resistance for impressing an electric potential therethrough, an electric power source for energizing said electrodes, a single phase of a power circuit of said source connected across a pair of said electrodes, means for withdrawing glass from said glass mass between said pair of electrodes, said means being grounded, a bridge circuit in parallel with said power circuit and having a potential dividing impedance, an adjustable tap connection extending between said impedance and ground and adaptable to at will divide the electric potential in said glass mass at the point of withdrawing glass therefrom in such a manner that said glass being withdrawn has substantially zero potential to ground, and current measuring means connected between the tap connection on said impedance and ground to indicate any current flow existing in the glass being withdrawn from said glass mass.

9. The combination defined in claim 8, wherein said means for withdrawing glass from the glass mass comprises a gathering ram device insertable into said glass mass for withdrawing working charges of glass therefrom by suction.

10. In a working zone of a glass furnace wherein glass is gathered for withdrawal therefrom, the combination of: a plurality of electrodes in said working zone and submerged in a molten glass mass contained therein, an electric power source, a phase power circuit of said source connected across different pairs of said electrodes to energize said electrodes and apply heat to the glass in the working zone by Joule effect of current flowing through the glass mass between said electrodes, said glass mass comprising a main resistance for impressing an electric potential between said electrodes, means for withdrawing glass from said glass mass between a selected pair of said electrodes, said means being grounded, a bridge circuit in said each said power circuit and connected therein across its pair of said electrodes and having a potential dividing impedance, an adjustable tap connection extending between said impedance and ground and adaptable to at will divide the electric potential in said glass mass at the point of withdrawing glass therefrom in such a manner that said glass being withdrawn has substantially zero potential to ground, and current measuring means connected between the tap connection on each said impedance and ground to detect any current flow existing in the glass being withdrawn from said glass mass.

References Cited in the file of this patent

UNITED STATES PATENTS 1,999,744   Wadman _____ Apr. 30, 1935